Feb. 11, 1947.  E. R. ZADEMACH ET AL  2,415,782
APPARATUS FOR TREATING CONTENTS OF SEALED CONTAINERS
Filed Dec. 14, 1943  2 Sheets-Sheet 1
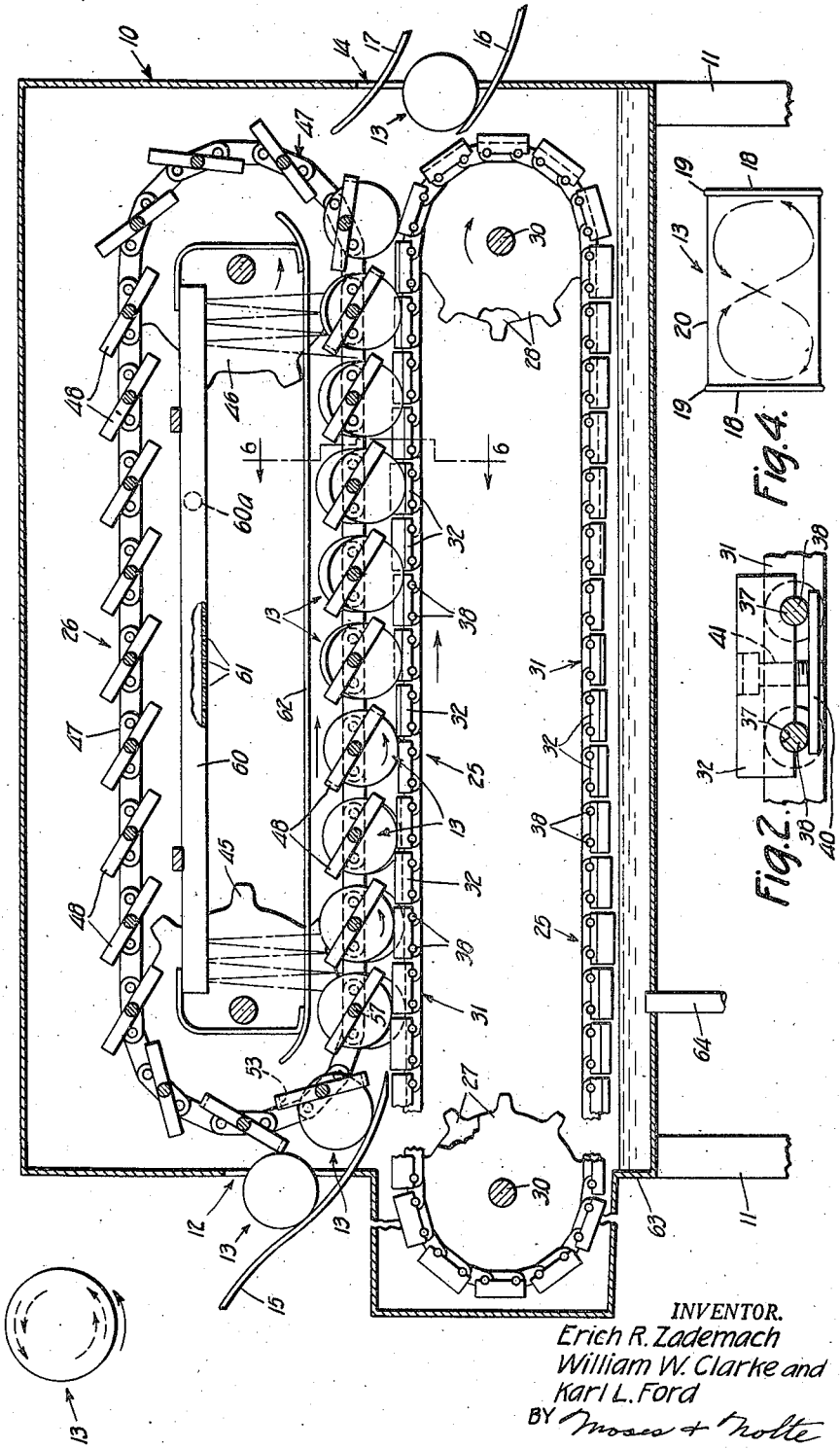
INVENTOR.
Erich R. Zademach
William W. Clarke and
Karl L. Ford
BY Moses & Nolte
ATTORNEYS

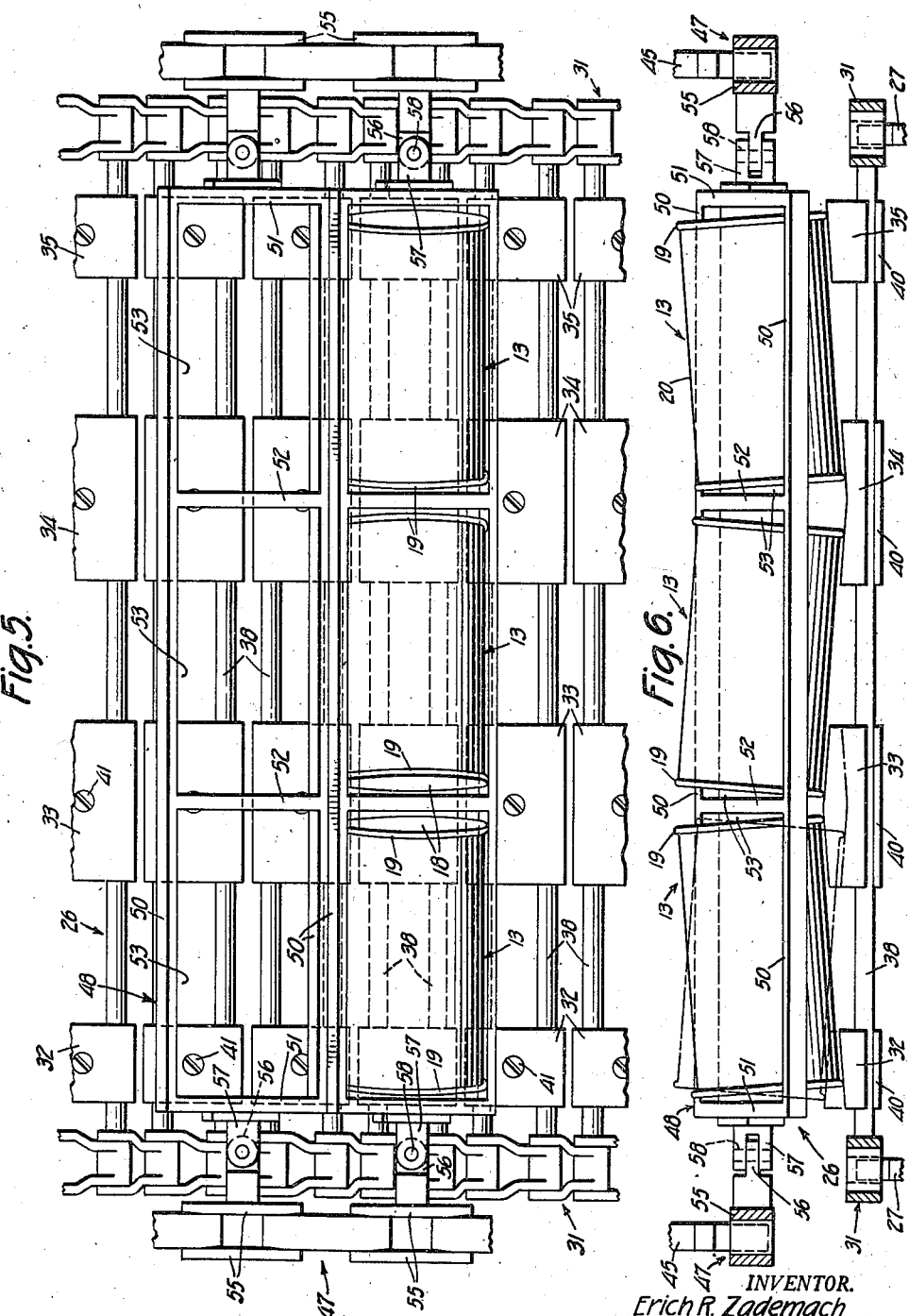

Patented Feb. 11, 1947

2,415,782

UNITED STATES PATENT OFFICE 2,415,782

APPARATUS FOR TREATING THE CONTENTS OF SEALED CONTAINERS

Erich R. Zademach, Hillside, and William W. Clarke, Summit, N. J., and Karl L. Ford, Horseheads, N. Y., assignors to Metalwash Machinery Company, Irvington, N. J., a copartnership Application December 14, 1943, Serial No. 514,252

11 Claims. (Cl. 259—54)

1

The present invention relates to an apparatus for treating the contents of sealed containers, and although the invention has a wide range of utility, it is particularly adaptable to the cooking or cooling of food products while in sealed cans, jars or other containers, hereinafter for brevity referred to as cans.

In the cooking of food in sealed cans, it is important to prevent the localized heating of the food, since this may result in over-cooking certain parts of the canned contents, especially those parts nearest the surface of the can, and under-cooking other parts. Also, in cooling cans which have been previously heated, it is desirable to stir up the contents of the can during cooling action to assure rapid cooling of its entire contents.

One object of the present invention is to provide a new and improved apparatus by which sealed containers are made to follow a regular predetermined agitational movement while being subjected to treatment, whereby the contents of the containers are stirred and uniform treatment of their contents assured.

Another object is to provide a new and improved apparatus by which sealed cans containing food products are made to follow a regular predetermined agitational movement while being heated or cooled, whereby the contents of the cans are stirred and uniform and more rapid cooking or cooling of the food therein assured.

A further object is to provide a new and improved continuous apparatus by which sealed containers while being continuously advanced, are treated and subjected to regular predetermined agitational movement.

Another object is to provide a new and improved continuous apparatus which treats advancing sealed containers while subjecting them to regular agitating movement, and which lends itself easily to effective selective control of the speed of agitation.

The theoretical overall rate of heating of the contents of a sealed container by application of heat to the exterior is limited by the rate of heat transfer through the container wall. In actual practice, this limiting rate is not reached or even closely approached because other factors such as the liquid film on the interior wall and the distribution of heat throughout the contents reduce the rate of heat flow. In effect, the temperature gradient through the container wall is not held to the maximum possible.

The food product within the container does not receive a uniform heat treatment and the portion at the container wall is overheated. With certain liquid products this overheating brings about changes which are detrimental to the product.

By agitating the contents, the heat is distributed throughout the contents, greatly increasing the overall rate of heat flow. Investigations have demonstrated that a slow end-over-end motion is a very effective means of obtaining the agitation required. The end-over-end agitation is most effective for products which have a large proportion of solid particles or products in which the liquid is heavy and viscous. Such agitation is difficult to produce mechanically, and no suitable devices are now available.

A rolling motion about the axis of a can will shorten the heating or cooling time. This motion is especially effective in reducing the liquid film and increasing the heat transfer from the container wall to the liquid. Actually, this is application of the well-established principle of heat transfer that high velocity of the liquid over the heating surface results in more rapid heat exchange.

However, it has been found that a simple rolling motion tends to produce straight line rather than turbulent flow in the liquid contents. Various arrangements have been suggested to break up this uniform state of the rotating liquid. One suggestion is a hump in the container wall. Another is a reciprocating motion applied to a rotating drum.

A purpose of the invention is to develop a combination motion which will possess all the features of the high speed rotary motion and the mixing action of the slow speed and end-over-end agitation.

Various other objects, features and advantages of the invention will be apparent from the following particular description, and from an inspection of the accompanying drawings, in which—

Fig. 1 is a longitudinal somewhat diagrammatic section of an apparatus which can be employed to carry out the method of the present invention, and which embodies the structural features of the present invention;

Fig. 2 is a detail transverse section of a portion of the apparatus;

Fig. 3 is an end view of one of the cans being treated, and indicates by arrows the rotary movement of the can and its contents produced by the apparatus of the present invention;

Fig. 4 is a side elevation of the can being treated, the arrow diagram indicating the projection on a vertical plane of the approximate course of movement of a particle in the can;

Fig. 5 is a fragmentary top plan view of a portion of the apparatus shown in Fig. 1; and Fig. 6 is an elevation of the portion of the apparatus shown in Fig. 5 and taken approximately along the line 6—6 of Fig. 1.

Referring to Fig. 1 of the drawings, the apparatus of the present invention comprises a treating chamber 10 shown mounted on suitable supports 11. One end of this treating chamber 10 has an inlet opening 12 through which the containers 13 to be treated are delivered continuously into the chamber, and an outlet opening 14 at the other end through which the treated containers are discharged. There is provided a chute 15 in the inlet opening 12 for directing the containers 13 towards the conveyor means in the interior of the chamber as will be hereinafter described, and a chute 16 in the outlet opening 14 by which the treated containers 13 are rolled out of the treating chamber 10. A ceiling wall 17 may be provided for the chute 16 to prevent bouncing of the cans as they are discharged from the conveyor system in the treating chamber 10.

The containers 13 are shown as cylindrical cans of the common well-known tinned iron type which have end caps 18 (Figs. 4 and 6) beaded over the ends of the intermediate cylindrical section 20, and which contain the usual food products. The beaded rim 19 on these cans 13 aid materially in frictionally driving said cans rotationally for stirring purposes as will be made apparent hereinafter.

As far as certain aspects of the invention are concerned, the treatment to which the cans 13 are subjected in the chamber 10 may be of any character. However, this treatment is desirably a heating or cooling one to cook or cool the contents of the cans 13 as they are advanced through the treating chamber 10, as will be more fully described.

Disposed in the treating chamber 10 is a lower conveyor 25 for supporting, rotating and tilting alternately in opposite directions the cans 13, and an upper conveyor 26, of comparatively slow speed, for advancing said cans forwardly along the treating chamber and at the same time holding them in predetermined spaced relationship.

The lower conveyor 25 comprises two spaced sets of sprocket wheels 27 and 28 (Fig. 6), one set of which is driven in any suitable manner through its supporting shaft 30. Each of these sets of sprocket wheels 27 and 28 comprises a pair of axially spaced sprocket wheels supported on a common shaft 30 and engaging a pair of drive chains 31 respectively. These lower drive chains 31 carry friction blocks 32, 33, 34 and 35 (Figs. 5 and 6), arranged in transverse rows extending between and spaced along said chains, and in longitudinal rows extending lengthwise along said chains. Each transverse row of blocks supports a row of cans 13 extending end to end between the two upper conveyor chains 31 in a direction transverse to the direction of movement of said chains. The blocks 32, 33, 34 and 35 in each transverse row are spaced between the two lower conveyor chains 31, so that the beaded ends of the cans 13 rest on said blocks. As the lower conveyor 25 advances, the cans 13 supported on these blocks 32, 33, 34 and 35 and restrained by the upper conveyor 26, are rotated and tipped in opposite directions by said blocks as will be made more apparent.

The blocks 32, 33, 34 and 35 are desirably of wood, fibre, plastic or metal to afford substantial friction for rotationally driving the cans 13, and to prevent injury to the cans 13 as they are dropped thereon from the inlet chute 15. These friction blocks are fastened for movement with the drive chains 31 desirably by providing the lower ends of each block with a pair of substantial semicircular recesses 37 (Fig. 2) and seating the block on a pair of adjoining transverse chain rods 38, with said rods extending snugly into said recesses respectively as shown in Fig. 2. These rods 38 extend between the two drive chains 31 (Figs. 5 and 6) and form the pintles by which the successive links of the drive chains 31 are pivotally interconnected.

For holding the blocks 32, 33, 34 and 35 of each transverse row against vertical movement and against slide movement along the chain rods 38, a plate 40 is clamped against the lower side of each pair of adjoining rods by means of a stud 41 threaded in said plate and passing through a respective friction block. These plates have been omitted in Fig. 1 for the purpose of clarity in the drawings. It will be understood, of course, that other methods may be employed for securing the blocks to the chains. For example, the blocks may be cast around the bars 38, or the blocks may be directly mounted on individual chains.

As the upper run of blocks 32, 33, 34 and 35 are moved to the right (Fig. 1) by the conveyor chains 31, the cans 13 supported on said blocks are retarded by the upper conveyor 26, thereby causing the transverse rows of the blocks to pass successively underneath transverse rows of cans 13. This causes the cans 13 to be rotationally driven in a counterclockwise direction (Figs. 1 and 3) by the frictional engagement of the blocks with the ends thereof. The beaded rims 19 at the ends of the cans 13 facilitate driving of these cans through the conveyor movement of the friction blocks 32, 33, 34 and 35.

While the cans 13 are supported and rotated as indicated, they are retained in predetermined spaced relationship, and are advanced at a rate determined by the movement of the upper conveyor 26. For that purpose, the upper conveyor 26 comprises two sets of sprocket wheels 45 and 46, each set consisting of a pair of spaced axially aligned sprocket wheels mounted on a common shaft. Two drive chains 47 pass over the two sets of sprocket wheels 45 and 46, and are driven in the direction indicated in Fig. 1 by a suitable drive connection to one of the sprocket shafts.

The upper conveyor drive chains 47 carry transversely therebetween a series of yokes 48 spaced therealong and adapted to hold the cans 13 against linear movement with the lower conveyor 25, while advancing said cans at a rate determined by the rate of linear movement of said conveyor chains 47. Each of these yokes 48 comprises a rectangular open frame having side frame pieces 50, end frame pieces 51 and intermediate cross pieces 52 extending between said side frame pieces, so that each of the yokes defines a series of adjoining rectangular openings 53. Three of these openings 53 in each yoke 48 are shown for holding three cans 13 end to end in a transverse row between the two upper conveyor chains 47, but it must be understood that as far as certain aspects of the invention are concerned, any number of these openings may be provided depending on the desired capacity of the machine. For example, as far as certain aspects of the invention are concerned, instead of providing each yoke 48 with multiple adjoining openings 53 as indicated, the yoke may be provided with only a single opening to hold a single can 13.

Each of the yoke openings 53 is large enough to retain can 13 loosely therein with enough clearance to permit the different movements of the can therein as will be set forth.

The yokes 48 are so mounted on the upper drive chains 47 as to be retained in a predetermined constant angular position with respect to the pitch line of said drive chains. For that purpose, interval links of each drive chain 47, as for example, each alternate outer straddling link 55, has rigid therewith an inward extension terminating in a tongue 56, and each yoke 48 has at each end rigid therewith and extending outwardly therefrom a clevis 57 engaging said tongue 56 as shown in Fig. 6. A pin 58 holds the tongue 56 and clevis 57 together against separation. The yokes 48 are thereby held against rotation with respect to the drive chains 47.

The yokes 48 are desirably arranged to extend obliquely downwardly in the direction of movement of the lower run of the upper conveyor chains 47, so that they exert a downward thrust on the cans 13 as the lower conveyor 25 tends to lift these cans.

As a can 13 is delivered into the treating chamber 10 through the inlet chute 15, a yoke 48 advancing downwardly around the bend of the upper conveyor 26 engages this can as shown in Fig. 1, so that from that time on until said can is released at the outlet end of said chamber, the movement of said can is controlled by the movement of this yoke. As this can 13 continues to move downwardly along the chute 15, the yoke 48 follows a circular path (Fig. 1), so that the can gradually works its way into a corresponding opening 53 of said yoke. By the time the can 13 reaches a position where it is fully supported on a pair of the blocks 32, 33, 34 and 35, said can will be fully extended into the corresponding yoke opening 53. In this initial fully supported position of the can 13, the encircling yoke 48 extends substantially diametrically of said can.

To assure the delivery of the cans 13 into registry with respective yoke openings 53, the delivery chute 15 may be longitudinally divided by partition walls or guides corresponding to the number of these openings in each yoke 48.

To facilitate the release of the cans 13 from the yokes 48 near the outlet end of the treating chamber 10, the lower run of the upper drive chains 47 slopes gradually away from the upper run of the lower drive chains 31. The cans 13 when they reach near this chamber outlet end will therefore have their corresponding yokes 48 disposed above the axes of these cans. As the upper drive chains 47 move upwardly over the upper sprocket wheels 46, the yokes 48 follow a circular path counterclockwise (Fig. 1) from their previously downwardly inclined positions, thereby gradually moving out of engagement with respective cans 13 until said cans are released for discharge along the chute 16.

The lower conveyor chains 31 move at a linear speed which is greater than the linear speed of the upper conveyor chains 47. The cans 13 therefore are rotated in a counterclockwise direction (Figs. 1 and 3) while being advanced at a speed controlled by the upper chains 47. The beaded rims 19 at the ends of the cans 13 facilitate driving of these cans counterclockwise through the conveyor movement of the friction blocks 32, 33, 34 and 35. Due to the inertia of the mass in the interior of the can 13, this counterclockwise rotation of the can 13 causes a counterclockwise rotation of the mass, but at a slower speed as indicated by the arrows in Fig. 3, so that the contents of the cans are peripherally displaced with respect to the surface of the cans.

The can 13 advanced along the treating chamber is not only subjected to rotary movement as indicated, but is also tilted by the blocks 32, 33, 34 and 35 endwise in opposite directions to assure effective stirring of the contents of the cans and therefore uniform treatment of said contents. For that purpose, the blocks 32, 33, 34 or 35 of each longitudinal row vary progressively in thickness beyond their mounting chain rods 38, so that the upper can supporting surfaces of these blocks in their upper run position are at different levels and conjointly define a gradual slope extending longitudinally of the lower conveyor 25. These can supporting block surfaces may be horizontal and arranged in steps, or may be inclined so that they all extend substantially in the same longitudinally inclined plane. The direction of variation of block thickness in each longitudinal row is opposite to that in the adjoining longitudinal row, so that the upper surfaces of the blocks of adjoining rows in the upper run of the lower conveyor 25 will be gradually inclined or stepped in opposite directions longitudinally of the lower conveyor 25. Therefore, as the blocks 32, 33, 34 or 35 in each longitudinal row pass successively below one end of a can 13, this end is gradually actuated upwardly or downwardly according to the direction of inclination of the can supporting surfaces presented by said blocks, while the other end is raised or lowered in the opposite direction at the same rate by the adjoining longitudinal row of blocks. In this manner, the cans 13 are tilted as they are carried along by the upper conveyor 26.

The blocks 32, 33, 34 or 35 of each longitudinal row are reduced progressively in thickness beyond their mounting chain rods 38 until a minimum thickness is reached and are then increased progressively in thickness towards a maximum thickness. In this manner, each can end is raised and lowered so that it is tiltably oscillated at a rate depending on the relative speed between the two conveyors 25 and 26 while it is being advanced through the treating chamber.

The surfaces of transversely adjoining blocks supporting opposite ends of a can 13 extend substantially horizontally or obliquely in the same plane to prevent interference of these blocks with the rolling movement of the can. Since each of the intermediate transversely adjoining blocks 33 and 34 supports the opposite ends of adjoining cans of a transverse can, the upper surface of each of these blocks not holding the can horizontally is desirably transversely bevelled doubly in opposite directions as shown in Fig. 3, so that these cans extend substantially parallel to these bevelled surfaces. With this arrangement proper contact of the rims 19 with the bevelled surfaces is always assured.

The heating of the cans 13 as they are advanced along the treating chamber 10 may be effected through the application of hot water, steam or hot gases. In the specific form shown, this heating is effected by discharging hot water onto the advancing cans 13 from bottom nozzle openings 61 in a container or chamber 60. This container 60 extends longitudinally of the upper conveyor 26 between the two runs thereof, and is disposed directly above the longitudinal rows of cans 13 respectively. The container 60 has connected thereto an inlet pipe 60a through which the hot water is supplied to said container. If desired, instead of providing a single container three hot water manifold pipes may be provided, one for each longitudinal row of cans 13, or a single pipe may be provided for the three rows, and the hot water may be projected from this pipe in streams which spread longitudinally transversely to an extent sufficient to impinge on the three longitudinal rows of cans.

Guide rails 62 above the rows of cans 13 may be provided to limit bouncing of the cans as they are advanced along the treating chamber 10. These rails 62 are narrow enough and are spaced a sufficient distance apart so as not to interfere with direct impingement of the hot water on to the advancing cans 13.

The hot water after heating the cans 13 is collected in a sumptank 63 formed at the bottom of the treating chamber 10, where by the addition of steam it can be brought up to the operating temperature and returned to the heating spray.

The cooling of the cans 13 after the heating process described can be effected in the same manner in a separate treating chamber similar to the one described.

In the heating operation described, as the cans 13 are advanced along the chamber 10 and are heated therein, they are rotated by the blocks 32, 33, 34 and 35 in a counterclockwise direction (Figs. 1 and 3) as described. This causes the hot water to be applied evenly on the surfaces of the rotating cans so that these can surfaces are heated uniformly. Due to the inertia of the mass in the interior of a can 13, this mass rotates at a slower speed as indicated in Fig. 3, so that rotational displacement between the can surface and the periphery of this mass is effected, thereby assuring uniform transfer of heat from the can surface to the contents of the can.

At the same time, while the can 13 is being rotated as indicated, it is being tiltably oscillated. In Fig. 4, the approximate course of a particle of the can contents as the result of the combined rotary and tiltable movement of the can is indicated. As the can rotates, a particle near the bottom of the can at its lower dipped end is rotated upwardly. At the same time, this lowered can end is rising and the other can end is lowering, so that the particle while being rotated upwardly is at the same time being shifted towards said other can end, and towards the center of the mass of the can contents. When the can reaches a point where it is tilted in an opposite direction, the particle continuing its movement towards the now lowered end of the can moves from the center of the mass towards the bottom of said lower can end. As the particle approaches the lowered end of the can, it is rotated upwardly towards the top of the can. This particle then returns to substantially its original position as indicated in Fig. 4 through the center of the can contents, as rotation and tilting of the can continues. It is seen, therefore, that the particles of the can contents are moved back and forth from one end of the can to the other end, and from the outer sections to the center of the can, thereby assuring effective stirring of the contents of the can without resorting to violent agitation. Uniform cooking of the can contents is assured without substantially breaking up the pieces in said can.

The rate of agitation of the cans 13 can be easily controlled by controlling the speeds of the two conveyors 25 and 26. For example, by increasing the speed of the lower conveyors 25 with respect to that of the upper conveyor 26, the rate of rotation and tiltable oscillation of the cans is increased. The speed of the upper conveyor 26 with respect to that of the lower conveyor 25 can also be altered to control the speed of agitation, but since this speed of the upper conveyor depends on the cooking or cooling time required and the desired rate of advancement of the cans 13 through the treating chamber 10, this speed is usually not altered for the purpose of controlling rate of agitation of the cans.

We have described what we believe to be the best embodiment of our invention. We do not wish, however, to be confined to the embodiments shown, but what we desire to cover by Letters Patent is set forth in the appended claims.

We claim:

1. An apparatus for stirring the contents of sealed cylindrical cans in transit, comprising a conveyor with a straightaway portion for supporting a series of cans on their sides along said conveyor, means for holding said cans in predetermined spaced relationship along said conveyor and for simultaneously advancing said cans continuously along said conveyor at a speed different than that of said conveyor while maintaining said cans free for rotation, whereby said cans are rotated about the longitudinal axes by the driving action of said conveyor, and means for simultaneously tilting said cans in opposite directions about their transverse axes intermediate their ends, and at a frequency depending on the speed of said conveyor as said cans are advanced along said conveyor.

2. An apparatus as described in claim 1, in which said can holding and advancing means comprises a conveyor having an endless drive element and a series of can holding yokes secured to said element at spaced intervals and each defining an opening large enough to receive loosely a can therein, and to permit rotation and tilting of the can in said opening.

3. An apparatus for stirring the contents of cans comprising a conveyor having a series of blocks for supporting the cans sideways thereon, conveyor means for advancing said cans along said conveyor, said blocks having can supporting surfaces varying progressively up and then down in elevation longitudinally of said conveyor, whereby as said blocks are moved successively underneath said cans they are rotated and at the same time tilted back and forth at a corrected rate depending on the rate of speed of said conveyor.

4. An apparatus as described in claim 3, in which two longitudinal rows of blocks are provided on said conveyor for supporting the ends of the cans, and in which the can supporting surfaces of one row of blocks slope conjointly in one direction longitudinally of said conveyor, while the adjoining can supporting surfaces of the other row of blocks slope conjointly in the opposite direction.

5. An apparatus as described in claim 3, in which the conveyor means comprises yokes each defining an opening large enough to receive a can therein and to permit rotation and tilting of the can in said opening.

6. An apparatus for stirring the contents of cans comprising a conveyor, said conveyor including two endless drive chains, link pintle rods extending transversely between said chains, and a series of blocks for supporting the cans sideways thereon, said blocks being arranged in two longitudinal rows between said chains, and being secured to said rods, conveyor means for advancing said cans along said conveyor, said blocks having can supporting surfaces varying progressively up and then down in elevation longitudinally of said conveyor, whereby as said blocks are moved successively underneath said cans, they are rotated and at the same time tilted back and forth.

7. An apparatus for stirring the contents of a sealed can comprising a conveyor for supporting a can on its side, means for advancing said can along said conveyor at a speed different than the speed of said conveyor, whereby said can is rotated about its longitudinal axis by the driving action of said conveyor, and means carried by said conveyor and movable therewith, for simultaneously tilting said can in opposite directions about a transverse axis intermediate its ends as said can is advanced along said conveyor.

8. An apparatus for stirring the contents of sealed cans comprising a support for a series of cans on their sides, a conveyor above said support having an endless drive member, yokes secured to said drive member at spaced intervals therealong and adapted loosely to receive respectively said cans, said yokes having constant angular relationship with respect to the pitch line of said drive member, a chute for delivering said cans successively to said yokes disposed near the inlet bend of said drive member, said yokes being arranged to engage said cans on said chute as said yokes follow around said bend to work progressively and automatically said cans into said yokes respectively.

9. An apparatus as set forth in claim 8, in which said yokes extend obliquely downwardly in the direction of movement of the lower run of said conveyor drive member.

10. An apparatus for stirring the contents of sealed cans comprising a support for a series of cans on their sides, a conveyor above said support having an endless drive member, and yokes secured to said drive member at spaced intervals therealong and adapted loosely to receive respectively said cans, said yokes extending obliquely downwardly in the direction of movement of the lower run of said conveyor, so that said yokes exert a downward thrust on said cans.

11. An apparatus as described in claim 10 in which said support and the lower run of said drive member relatively slope apart towards the discharge end of said conveyor.

ERICH R. ZADEMACH.
WILLIAM W. CLARKE.
KARL L. FORD.

REFERENCES CITED

The following references are of record in the file of this patent:

UNITED STATES PATENTS

| Number | Name | Date |
| --- | --- | --- |
| 1,227,100 | Wehmiller | May 22, 1917 |
| 2,322,693 | Kennedy | June 22, 1943 |
| 1,591,645 | Rafu | July 6, 1926 |
| 2,062,331 | Page et al. | Dec. 1, 1936 |
| 1,044,822 | Schaefer | Nov. 19, 1912 |
| 1,446,955 | Wilcox | Feb. 27, 1923 |
| 802,254 | Baker et al. | Oct. 17, 1905 |
| 1,721,562 | Keeney | July 23, 1929 |

FOREIGN PATENTS

| Number | Country | Date |
| --- | --- | --- |
| 844,428 | French | Apr. 24, 1939 |
| 453,611 | British | Sept. 15, 1936 |